(12) United States Patent
Yoshida et al.

(10) Patent No.: US 9,767,412 B2
(45) Date of Patent: Sep. 19, 2017

(54) TEST SIZE REDUCTION USING DON'T CARE ANALYSIS

(71) Applicant: FUJITSU LIMITED, Kawasaki-shi, Kanagawa (JP)

(72) Inventors: Hiroaki Yoshida, Cupertino, CA (US); Cuong Nguyen, Hayward, CA (US); Indradeep Ghosh, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 420 days.

(21) Appl. No.: 14/477,735

(22) Filed: Sep. 4, 2014

(65) Prior Publication Data
US 2016/0071012 A1 Mar. 10, 2016

(51) Int. Cl.
*G06N 5/04* (2006.01)

(52) U.S. Cl.
CPC ...................... *G06N 5/04* (2013.01)

(58) Field of Classification Search
CPC ......................................... G06N 5/04
See application file for complete search history.

(56) References Cited

U.S. PATENT DOCUMENTS

2009/0216701 A1* 8/2009 Bjorner ............... G06N 5/02
706/47

OTHER PUBLICATIONS

R. Nieuwenhuis et al., "Solving SAT and SAT Modulo Theories: From an Abstract Davis-Putnam-Logemann-Loveland Procedure to DPLL(T)", J. Assoc. Computing Mach., vol. 53, No. 6, Nov. 2006, pp. 937-977.*
Bauer, A, Leucker, M, Schallhart, C et al 2010, 'Don't care in SMT: Building flexible yet efficient abstraction/refinement solvers', International Journal on Software Tools for Technology Transfer, vol. 12, No. Published online: Nov. 10, 2009, pp. 23-37.

* cited by examiner

*Primary Examiner* — Vincent Gonzalez
(74) *Attorney, Agent, or Firm* — Maschoff Brennan

(57) ABSTRACT

Systems and methods are disclosed to determine "don't care" variables in programming code. The method comprises obtaining an SMT formula having a plurality of SMT variables from programming code; obtaining a simplified SMT formula from the SMT formula, the simplified SMT formula includes a plurality of simplified SMT variables; obtaining an SAT formula from the simplified SMT formula, the SAT formula includes a plurality of SAT variables; determining which of the plurality of the SMT variables are "don't care" variables from the simplified SMT formula; and determining which of the plurality of the SMT variables are "don't care" variables from the simplified SAT formula.

20 Claims, 5 Drawing Sheets

US 9,767,412 B2

TEST SIZE REDUCTION USING DON'T CARE ANALYSIS

FIELD

This disclosure relates generally to test size reduction using don't care analysis.

BACKGROUND

Satisfiability modulo theories (SMT) solving and satisfiability (SAT) solving may allow a computer to reason about systems and computations symbolically. SMT and SAT solving may be used in software verification, symbolic analysis, program verification, automatic testing, security checking, and the like. SAT solving may include determining whether a model of a propositional formula exists such that the formula evaluates as TRUE. SMT solving may include SAT solving in which propositional variables of the SAT problem are replaced with formulas of another mathematical theory.

To perform SMT solving and SAT solving, some methods and systems may employ the Davis-Putnam-Logemann-Loveland (DPLL) algorithm. The DPLL algorithm is a backtracking-based search algorithm for deciding SAT of propositional logic formulae. Theory solvers may be used with the DPLL algorithm to perform SMT solving. Additional methods and systems have been developed that may improve the performance of the DPLL algorithm. For example, the DPLL may be adapted to employ backjumping, restarting, and/or clause learning.

Efficiency in SMT and SAT solving may remain a significant obstacle, however, particularly when attempting to solve increasingly large problems.

SUMMARY

Systems and methods are disclosed to determine "don't care" variables in programming code. The method comprises obtaining an SMT formula having a plurality of SMT variables from programming code; obtaining a simplified SMT formula from the SMT formula, the simplified SMT formula includes a plurality of simplified SMT variables; obtaining an SAT formula from the simplified SMT formula, the SAT formula includes a plurality of SAT variables; determining which of the plurality of the SMT variables are "don't care" variables from the simplified SMT formula; and determining which of the plurality of the SMT variables are "don't care" variables from the simplified SAT formula.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to determine "don't care" variables found within programming code. Various tests may be performed on computer or software programming code for any number of purposes such as, for example, verification, troubleshooting, optimization, quality assurance, symbolic analysis, program verification, automatic testing, security checking etc. The size and scope of most programming code results in a large number of variables that may need to be tested. In some situations, some variables may be redundant to the programming code. For instance, a change to a "don't care" variable does not result in a change to the execution path of the programming code. These variables may be referred to as "don't care" variables. By determining the set of "don't care" variables the various tests may ignore the "don't care" variables, and the efficiency of these tests may be increased. Application of some of the embodiments described herein may be used to reduce the number of variables by identifying "don't care" variables.

Figure 1:
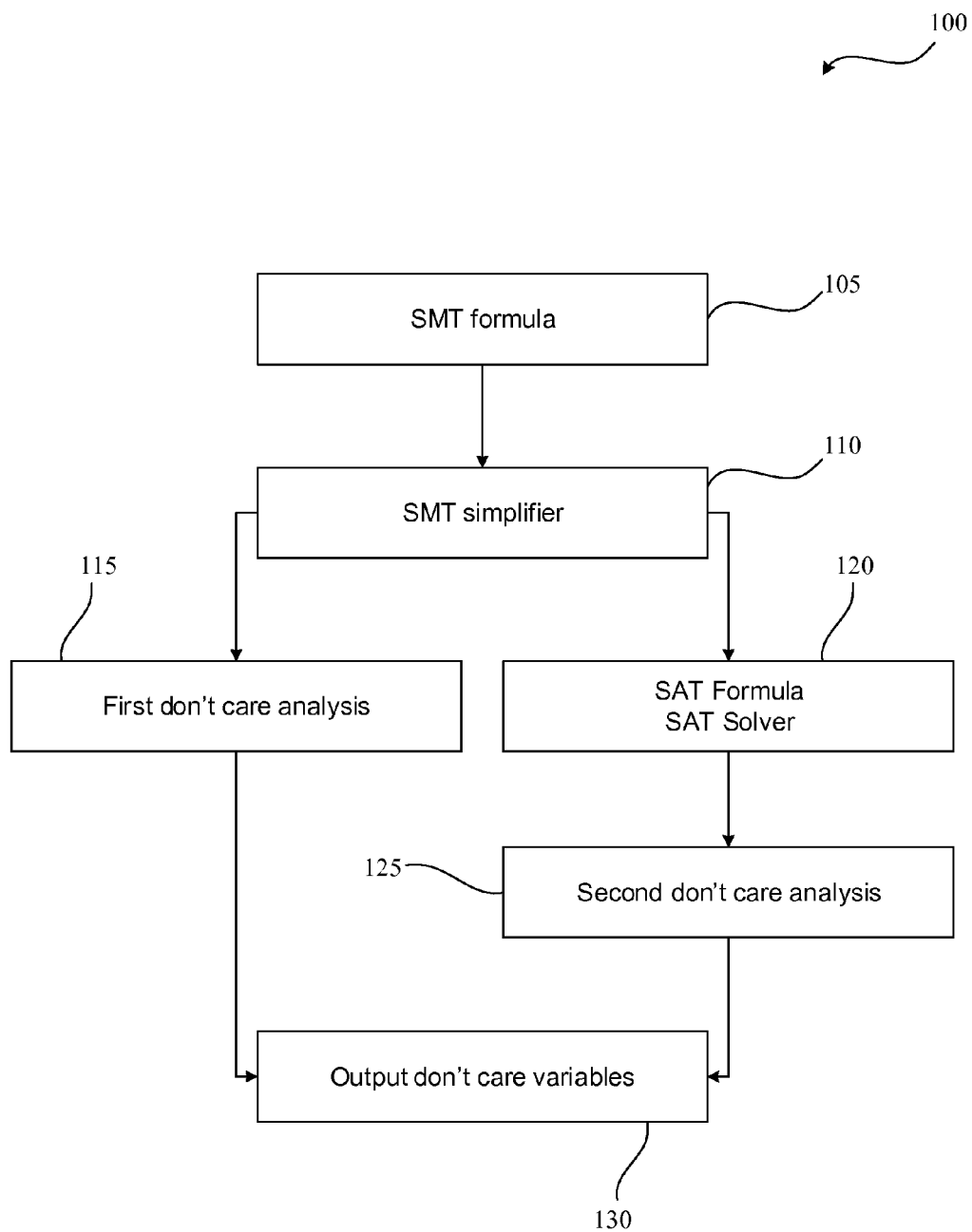
FIG. 1 is an example flowchart of a process for finding "don't care" variables according to some embodiments described herein.

FIG. 1 is an example flowchart of a process 100 for finding "don't care" variables according to some embodiments described herein. One or more steps of the process 100 may be implemented, in some embodiments, by one or more components of the computing environment 200 of FIG. 2 and/or the computational system 500 of FIG. 5. Although illustrated as discrete blocks, various blocks may be divided into additional blocks, combined into fewer blocks, or eliminated, depending on the desired implementation.

At block 100 an SMT formula may be created from code and/or the SMT formulas may be input from another system, process, method or system. Any technique known in the art may be used to create or input the SMT formula.

At block 105, the SMT formula may be simplified. Simplification of the SMT formula may reduce any redundancies in the SMT formula, create new variables, and/or remove variables. Various algorithms can be used as discussed below to simplify an SMT formula. An SMT substitution map between the SMT formula and the simplified SMT formula may also be created. The simplified SMT formula may be input into two different "don't care" analyses: a first "don't care" analysis 115 and a second "don't care" analysis 125. An example, of the first "don't care" analysis is described in the process 300 shown in FIG. 3. The first "don't care" analysis analyzes simplified SMT variables to determine "don't care" variables.

Figure 4:
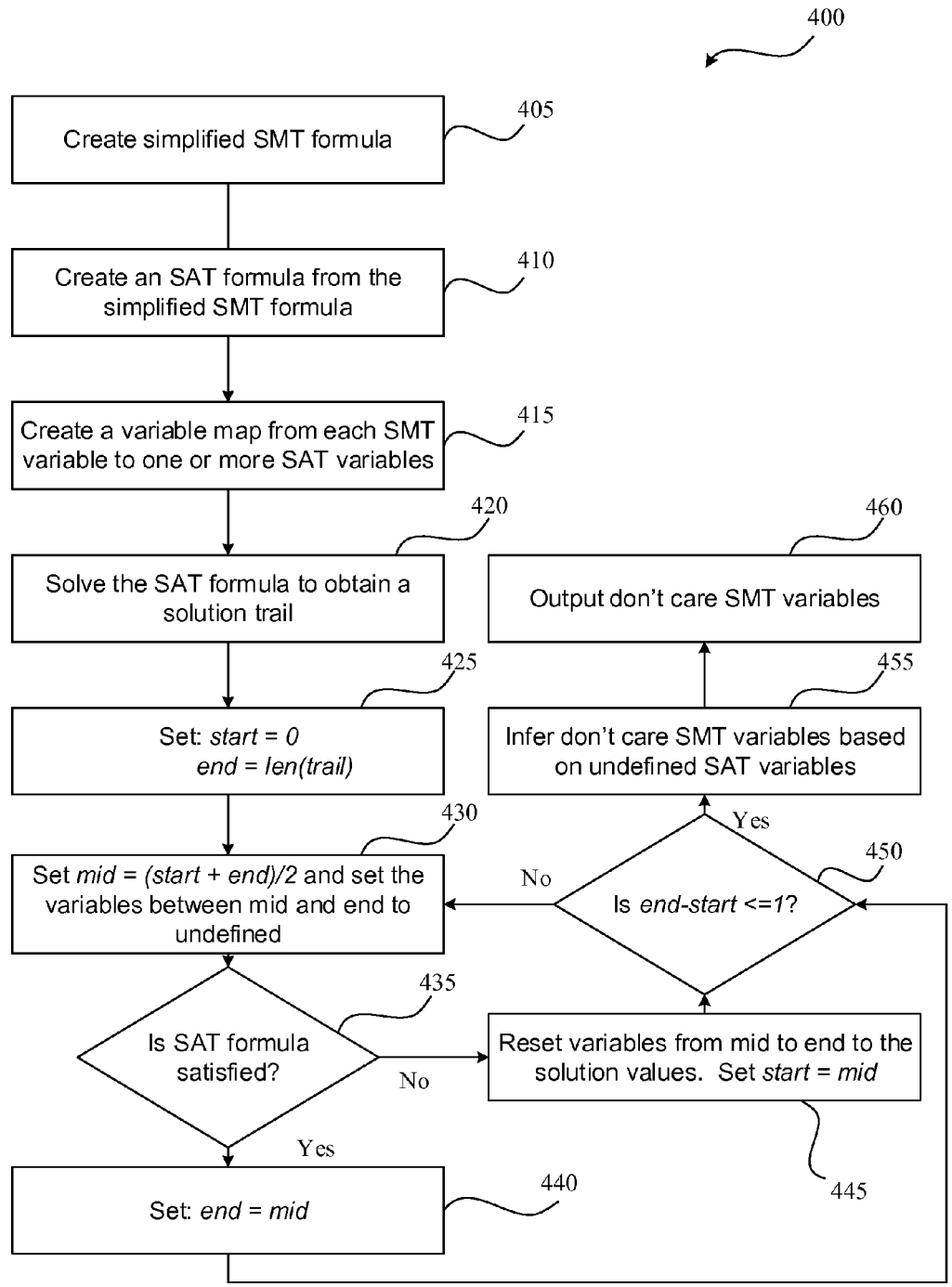
FIG. 4 is another flowchart of an example process 300 for finding a set of "don't care" SMT variables, according to at least one embodiment described herein.

The second "don't care" analysis 125 is described in more detail in the process 400 shown in FIG. 4. The second "don't care" analysis may use an SAT formula and/or SAT variables to determine "don't care. At block 120 an SAT solver may be used to create an SAT formula with SAT variables and/or solve the SAT formula. The second "don't care" analyzes a pattern of the SAT variables to determine "don't care" variables. At block 130 the "don't care" variables may be output. The "don't care" variables can then be used in conjunction with the programming code to determine whether there are errors in the programming code.

Figure 2:
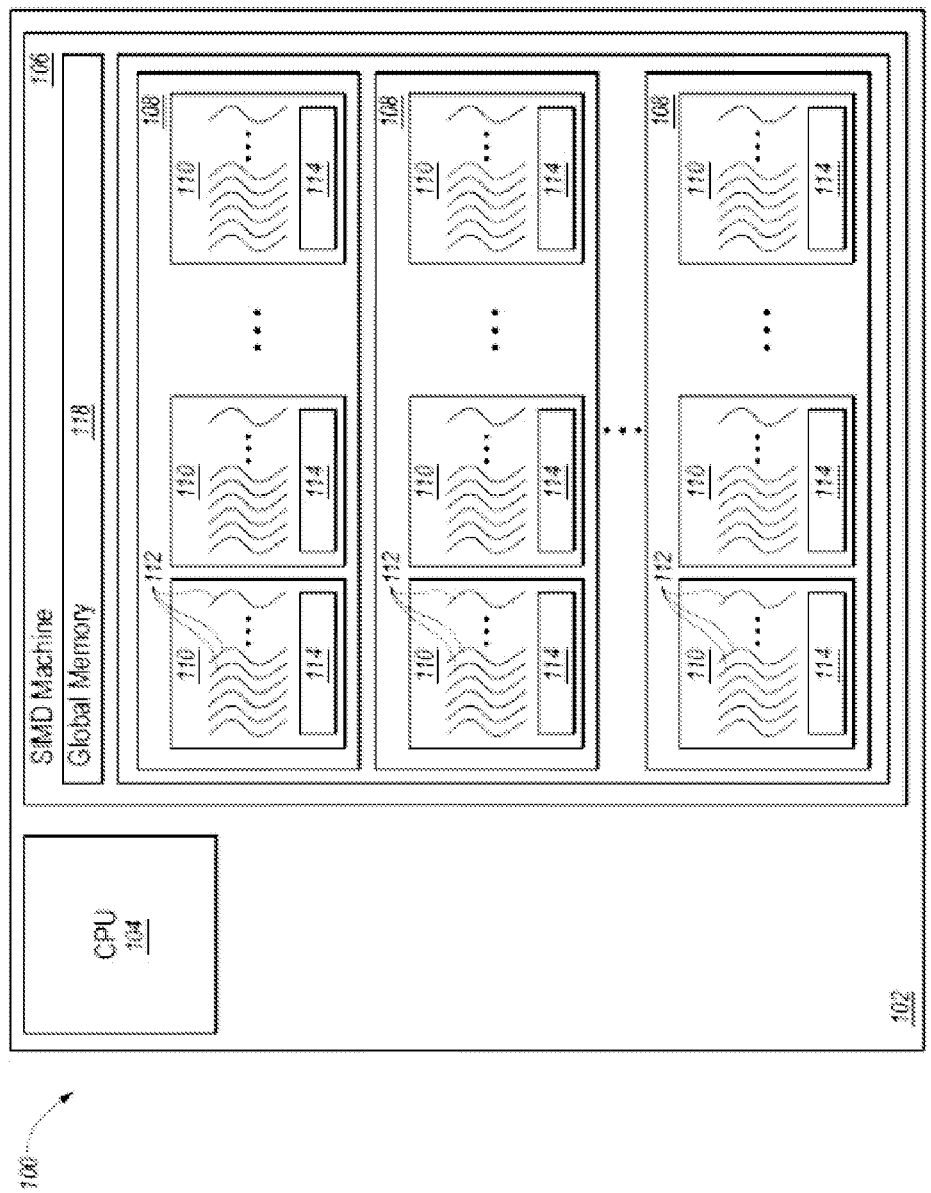
FIG. 2 is a block diagram of an example computing environment, arranged in accordance with at least some embodiments described herein.
Figure 5:
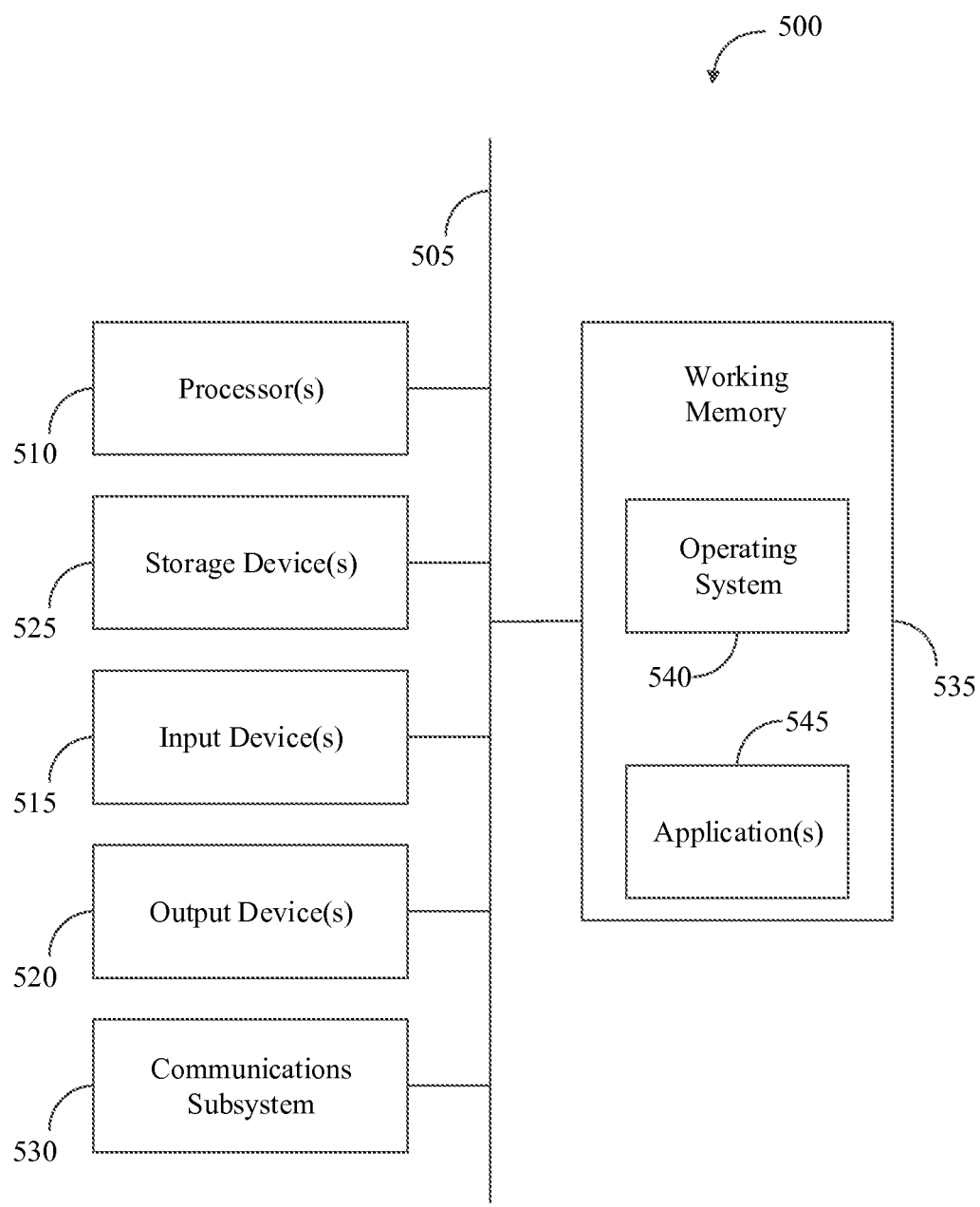
FIG. 5 shows an illustrative computational system for performing functionality to facilitate implementation of embodiments described herein.

FIG. 2 is a block diagram of an example computing environment 200, arranged in accordance with at least some embodiments described herein. As illustrated, the computing environment 200 includes a computing entity 202. The computing entity 202 may include a special purpose or general-purpose computer including various computer hardware or software modules, as discussed in greater detail below. As an example, the computing entity 202 may be a mobile phone, smart phone, personal computer, tablet, hand held electronic device, game console, and/or other embedded system. Computational system 500 shown in FIG. 5 is another example of a computing entity 202.

The computing entity 202 may include a central processing unit (CPU) 204 and a single instruction, multiple data (SIMD) machine 206. The SIMD machine 206 may include multiple processing elements that perform the same or similar operations on multiple sets of data in parallel. For example, the SIMD machine 206 may be a graphics processing unit (GPU) that may be used in the computing entity 202 to accelerate the building of images intended for output to a display coupled to or part of the computing entity 202. In these and other embodiments, the SIMD machine 206 may often remain largely idle when heavy graphics processing is not required.

The SIMD machine 206 may include multiple grids 208. Each grid may include multiple blocks 210. Each block 210 may include multiple threads 212. A grid 208 of blocks 210 may be instructed by a kernel (not illustrated) and/or some other portion of the computing entity 202 to run an algorithm. The threads 212 of a given block 210 may run the same algorithm simultaneously on different parts of a set of data. Multiple blocks 210 of the threads 212 may run simultaneously. Generally, the threads 212 within one block 210 may cooperate with other threads within the same block 210 via shared memory 214. The shared memory 214 may be located on-chip with the processing elements of the SIMD machine 206. In some embodiments, the threads 212 within the different blocks 210 may cooperate via global memory 218. The global memory 218 may be located off-chip and/or on the SIMD machine 206. For example, the global memory 218 may be located off-chip and in dynamic random-access memory (DRAM) (not illustrated) on the SIMD machine 206. In some embodiments, the CPU 204 may access the global memory 218.

In some embodiments, a kernel or other part of the computing entity 202 may provide the SIMD machine 206 with a formula and instructions for SAT and/or SMT checking Different parts of the formula may be assigned to different threads 212 of the SIMD machine 206. The SIMD machine 206 may then execute the threads 212 assigned the parts of the formula to perform the SAT and/or SMT checking.

Embodiments described herein may be implemented using computer readable media for carrying or having computer executable instructions or data structures stored thereon. Such computer readable media may be any available media that may be accessed by the computing entity 202. By way of example, and not limitation, such computer readable media may include tangible computer readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer executable instructions or data structures and which may be accessed by the computing entity 202. Combinations of the above may also be included within the scope of computer readable media.

Computer executable instructions may include, for example, instructions and data that cause the computing entity 202, including the CPU 204, the SIMD machine 206, or other processing device to perform a certain function or group of functions.

The systems and methods described herein may be implemented in software, hardware, or a combination of software and hardware. In this description, the computing entity 202 may be any computing system as defined herein, or any module or combination of modulates running on a computing system.

Figure 3:
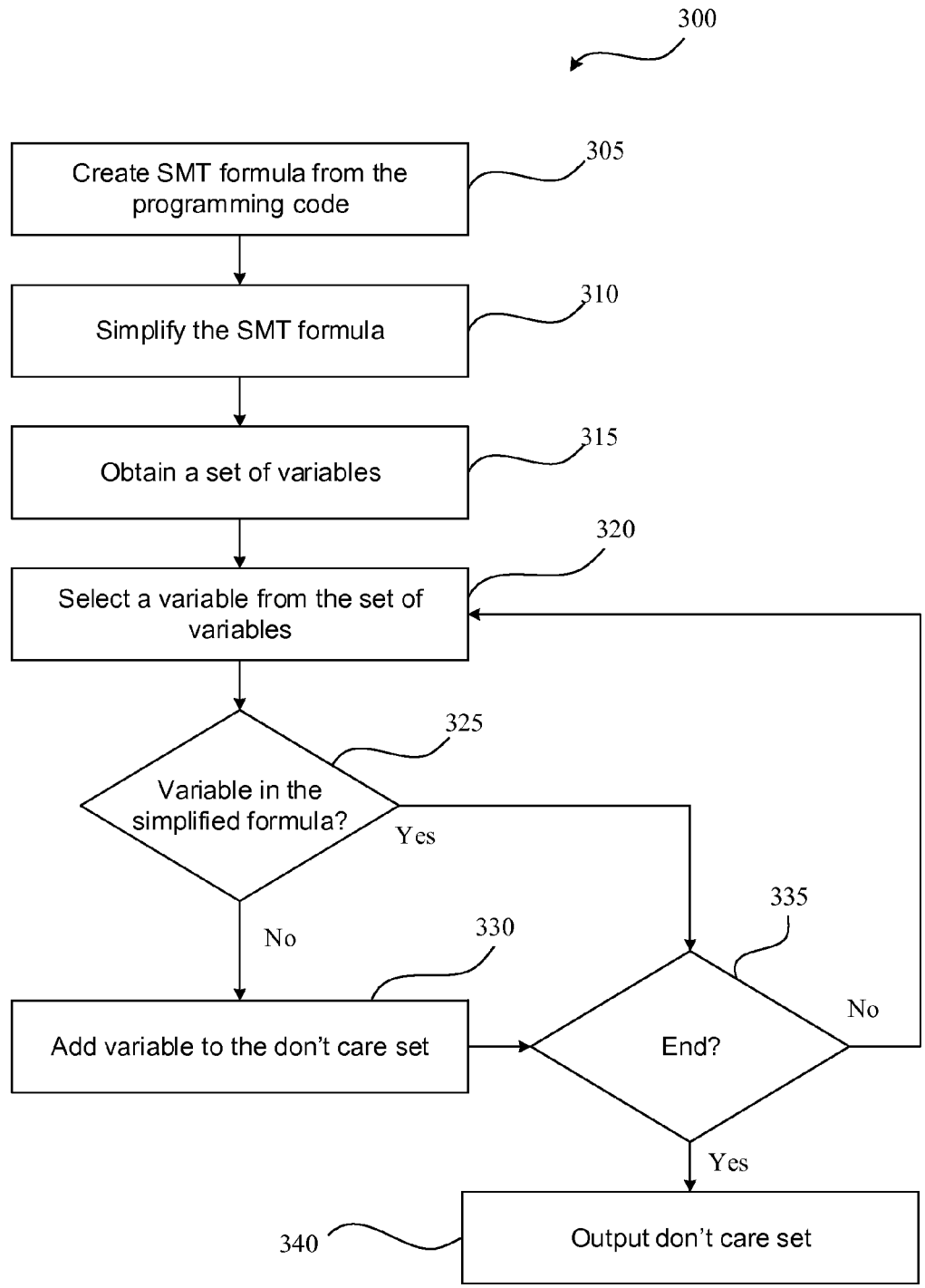
FIG. 3 is a flowchart of an example process 300 for finding a set of "don't care" SMT variables, according to at least one embodiment described herein.

FIG. 3 is a flowchart of an example process 300 for finding a set of "don't care" SMT variables, according to at least one embodiment described herein. One or more steps of the process 300 may be implemented, in some embodiments, by one or more components of the computing environment 200 of FIG. 2 and/or the computational system 500 of FIG. 5. Although illustrated as discrete blocks, various blocks may be divided into additional blocks, combined into fewer blocks, or eliminated, depending on the desired implementation.

Process 300 begins at block 305 where an SMT formula is created from programming code. The programming code may include any type of programming code such as, for example, C, C++, Python, BASIC, FORTRAN, etc. The SMT formula may be created by going through all the execution paths of the programming code to determine whether any or all the formulas in the programming code express constraints that have a solution. The SMT formula may be created using any SMT solver such as, for example, Ario, Barcelogic, CVC, CVC Lite, CVC3, ExtSAT, Harvey, HTP, ICS (SRI), Jat, MathSAT, Sateen, Simplify, AProVE, STeP, STP, SVC, TSAT, UCLID, Yices (SRI), Zap (Microsoft), Z3 (Microsoft), etc.

At block 310 the SMT formula may be simplified to create a simplified SMT formula. The SMT formula may be simplified using any technique known in the art such as, for example, a linear solver and/or array read/write elimination. The simplified SMT formula may introduce new variables not previously found in the SMT formula and/or eliminate variables found in the SMT formula. An SMT substitution map may also be created that maps new variables in the simplified SMT formula to variables in the SMT formula.

At block 315 a set of SMT variables may be obtained from the SMT formula. This set of SMT variables may include the entire set of variables or a subset of the variables in the SMT formula.

At block 320 an SMT variable may be selected from the set of SMT variables. If it is determined at block 325 that the SMT variable is not found within the simplified SMT formula and is not found within in the SMT substitution map, then process 300 moves to block 330. At block 330, the SMT variable may be added to the "don't care" set of SMT variables. Because the SMT variable is not used in the simplified SMT formula or mapped to a new SMT variable in the simplified SMT formula by the SMT substitution map, then the variable is unnecessary. Following block 330 process 300 proceeds to block 335.

If it is determined at block 325 that the SMT variable is found within the simplified SMT formula and is found in the SMT substitution map, then process 300 moves to block 335. If an SMT variable from the set of SMT variables has not yet been be selected at block 320, the process 300 returns to block 320 and another SMT variable may be selected from the set of SMT variables. If every SMT variable from the set of SMT variables has been selected at block 320, then process 300 may proceed to block 340 where the "don't care" set of SMT variables may be output. The "don't care" variables can then be used in conjunction with the programming code to determine whether there are errors in the programming code.

FIG. 4 is another flowchart of an example process 400 for finding a set of "don't care" SMT variables, according to at least one embodiment described herein. One or more steps of the process 400 may be implemented, in some embodiments, by one or more components of the computing environment 200 of FIG. 2 and/or the computational system 500 of FIG. 5. Although illustrated as discrete blocks, various blocks may be divided into additional blocks, combined into fewer blocks, or eliminated, depending on the desired implementation.

The process 400 begins at block 405 where a simplified SMT formula may be obtained. This simplified SMT formula may be obtained, for example, as noted in blocks 305 and 310 of FIG. 3 and the related description. Any number of algorithms and/or techniques may be used to simplify the SMT formula. Alternatively, the SMT formula may not be simplified and the remainder of process 400 may execute on the SMT formula without simplification.

At block 410 a SAT formula may be created from the simplified SMT formula. The SAT formula may be created, for example, by bitblasting the simplified SMT formula. The resulting the SAT formula may translate SMT variables into Boolean variables. For example, a 32 bit SMT variable will translate into 32 SAT variables of one bit. Moreover, the various functions and/or operators in the simplified SMT formula may be translated into logic functions in the SAT formula.

The SAT formula may be created using any solver such as, for example, a bitblaster, ACL2 algorithms, BoolSAT, minisat-in-your-browser, SATRennesPA, MniSAT, Lingeling, PicoSAT, Sat4j, DPLL, Glucose, RSat, UBCSAT, CryptoMiniSat, Spear, HyperSAT, BASolver, ArgoSAT, Fast SAT solver, zChaff, BCSAT, WinSAT, etc.

At block 415 an SAT-SMT variable map may be created that maps each variable in the simplified SMT formula to one or more variables in the SAT formula. At block 420 the SAT formula may be solved to create a solution trail (e.g., a truth table). This may be done using any backtracking algorithm such as, for example, a DPLL algorithm, a DPLL based algorithm, or a similar algorithm. The solution trail may return, for example, an ordered list of Boolean values associated with each SAT variable.

The remaining blocks of the process 400 may be used to determine which of the SAT variables in the solution set of SAT variables that are "don't care" variables. This may be done, for example, by finding the first "don't care" variable in the ordered solution set of SAT variables that is a "don't care" variable and then specifying or labeling the rest of the SAT variables as "don't care" variables. Any technique may be used to determine this first "don't care" value such as, for example, by iteratively working from the beginning (or the end) of the solution set of SAT variables until the first (or last) "don't care" variable is found. Blocks 425 through 450 illustrate another example.

At block 425 some iteration values may be set. For example, start may be set to correspond with the first value in the solution trail of the SAT variables (start=0) and end may be set to equal the length of the solution trail of the SAT variables (end=len(trail)).

At block 430 mid may be set to a variable in the middle between the start variable and the end of the solution trail of the SAT variables (mid=(end−start)/2). In some embodiments, mid may be rounded upwards or downwards to the nearest integer.

At block 435 it may be determined whether the SAT formula is satisfied using the solution trail of the SAT variables. The SAT formula, for example, may be considered satisfied when all constraints are satisfied.

If the SAT formula is satisfied at block 435, then end may be set to mid at block 440 and process 400 may proceed to block 450. If the SAT formula is not satisfied at block 435, then the variables from mid to end may be reset to the solution values and start may be set to mid at block 445.

At block 450, if the difference between start and end is less than or equal to one, (end−start<=1), then process 400 moves to block 455. Otherwise the process 400 moves to block 430. The process 400 may repeat any number of times until the exit condition noted in block 450 is satisfied.

At block 455 the "don't care" SMT variables may be inferred from the undefined SAT variables using the SMT-SAT solution map. For example, SMT variables associated with undefined SAT variables in the SAT solution map may be considered "don't care" SMT variables. At block 460 the "don't care" SMT variables may be output. The "don't care" variables can then be used in conjunction with the programming code to determine whether there are errors in the programming code.

In a specific example, the solution set of SAT variables may be written as follows:

| p | cnf | 14 | 10 | | |
|---|---|---|---|---|---|
| 2 | −7 | −8 | −9 | −3 | 0 |
| −2 | 3 | 0 | | | |
| −2 | 7 | 0 | | | |
| −2 | 9 | 0 | | | |
| −2 | 8 | 0 | | | |
| 3 | 5 | −6 | 0 | | |
| −3 | −5 | 0 | | | |
| −3 | 6 | 0 | | | |
| 14 | 0 | | | | |
| 2 | 0. | | | | |

In this specific example, the following is an example SAT solution map created from a DPLL algorithm:
2: true
14: true
3: true
7: true
9: true
8: true
5: false
6: true
1: true
4: true
10: true
11: true
12: true
13: true.

The solution map is an ordered list. In this example, at starting at block 425 and block 430, start=0, end=14, and mid=7. The SAT variables of the solution trail of the SAT variables between mid and end in the SAT solution map may be set to undefined as follows:
  2: true
  14: true
  3: true
  7: true
  9: true
  8: true
  5: false
  6: undefined
  1: undefined
  4: undefined
  10: undefined
  11: undefined
  12: undefined
  13: undefined.

In this specific example, the solution set of the SAT variables is not satisfied with the solution trail of the SAT variables. For instance, the solution set of SAT variables requires variable 6, yet this variable is listed in the solution trail of the SAT variables as undefined. Hence, at block 435 process 400 moves to block 445, and start is set equal mid: start=7. The process 400 may then proceed to block 450 and process 400 proceeds to block 430 because end−start=14−7=7, which is greater than 1. At block 430, mid=(14+7)/2=10, and the SAT variables of the solution trail of the SAT variables between mid and end in the SAT solution map may be set to undefined as follows:
  2: true
  14: true
  3: true
  7: true
  9: true
  8: true
  5: false
  6: true
  1: true
  4: true
  10: undefined
  11: undefined
  12: undefined
  13: undefined.

In this example, at block 435, the SAT formula is satisfied. For instance, no undefined terms are used in the SAT formula. But the position of the first SAT variable is still unknown. The process 400 then proceeds to block 440 where end=mid=10. The process 400 then proceeds to block 450, where it is determined whether the process should end. In this case, end−start=10−7=3, which is greater than 1. So the process 400 continues to block 430. At block 430, mid=(end+start)/2=(10+7)/2=8. The SAT variables of the solution trail of the SAT variables between mid and end in the SAT solution map may be set to undefined as follows:
  2: true
  14: true
  3: true
  7: true
  9: true
  8: true
  5: false
  6: true
  1: undefined
  4: undefined
  10: undefined
  11: undefined
  12: undefined
  13: undefined.

At block 435 it should be determined that the SAT formula is satisfied since no undefined terms are needed in the SAT formula. The process 400 then moves to block 445 where start is set to equal mid: start=8. The process 400 may then proceed to block 450, where it is determined whether the process should end. In this case, end−start=10−8=2, which is greater than 1. So the process 400 continues to block 430. At block 430, mid=(end+start)/2=(10+8)/2=9. At block 430, mid=(end+start)/2=(10+8)/2=9 and the SAT variables of the solution trail of the SAT variables between mid and end in the SAT solution map may be set to undefined as follows:
  2: true
  14: true
  3: true
  7: true
  9: true
  8: true
  5: false
  6: true
  1: true
  4: undefined
  10: undefined
  11: true
  12: true
  13: true.

At block 435 it may be determined that the SAT formula is satisfied since no undefined terms are needed in the SAT formula. The process 400 moves to block 445 where start is set to equal mid: start=9. The process 400 may then proceed to block 450, where it is determined whether the process should end. In this case, end−start=10−9=1, which is equal to 1 so the process 400 moves to block 455.

At block 455 that SAT variables listed in the SAT solution map from mid to the end of the list of variables may be identified. In this specific example, these variables include variables 4, 10, 11, 12, and 13. Using the SAT-SMT variable map, SMT variables associated with these SAT variables may be identified and output at block 460. The "don't care" variables can then be used in conjunction with the programming code to determine whether there are errors in the programming code.

Various other examples of process 400 and/or process 300 can be anticipated.

The computational system 500 (or processing unit) illustrated in FIG. 5 may be used to perform and/or control operation of any of the embodiments described herein. For example, the computational system 500 may be used alone or in conjunction with other components. As another example, the computational system 500 may be used to perform any calculation, solve any equation, perform any identification, and/or make any determination described here.

The computational system 500 may include any or all of the hardware elements shown in the figure and described herein. The computational system 1200 may include hardware elements that may be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration chips, and/or the like); one or more input devices 515, which may include, without limitation, a mouse, a keyboard, and/or the like; and one or more output devices 520, which may include, without limitation, a display device, a printer, and/or the like.

The computational system 500 may further include (and/or be in communication with) one or more storage devices 525, which may include, without limitation, local and/or network-accessible storage and/or may include, without limitation, a disk drive, a drive array, an optical storage device, a solid-state storage device, such as random access memory ("RAM") and/or read-only memory ("ROM"), which may be programmable, flash-updateable, and/or the like. The computational system 500 might also include a communications subsystem 530, which may include, without limitation, a modem, a network card (wireless or wired), an infrared communication device, a wireless communication device, and/or chipset (such as a Bluetooth® device, a 802.6 device, a WiFi device, a WiMAX device, cellular communication facilities, etc.), and/or the like. The communications subsystem 530 may permit data to be exchanged with a network (such as the network described below, to name one example) and/or any other devices described herein. In many embodiments, the computational system 500 will further include a working memory 535, which may include a RAM or ROM device, as described above.

The computational system 500 also may include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from the computational system 500 (e.g., a removable medium, such as a compact disc, etc.), and/or provided in an installation package, such that the storage medium may be used to program a general-purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.), then takes the form of executable code.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device may include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above may be varied—for example, blocks may be re-ordered, combined, and/or broken into sub-blocks. Certain blocks or processes may be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A method comprising:
obtaining, via analysis of each execution path of programming code stored in a local storage device, an SMT formula having a plurality of SMT variables from the programming code;
obtaining a simplified SMT formula from the SMT formula, the simplified SMT formula including a plurality of simplified SMT variables;
obtaining an SAT formula from the simplified SMT formula, the SAT formula including a plurality of SAT variables;
determining, via at least one processor, which of the plurality of the SMT variables are "don't care" variables using the simplified SMT formula;
determining, via the at least one processor, which of the plurality of the SMT variables are "don't care" variables using the SAT formula; and
using the "don't care" variables determined based on each of the simplified SMT formula and the SAT formula to determine whether an error exists in the programming code.

2. The method according to claim 1, wherein the determining which of the plurality of the SMT variables are "don't care" variables from the simplified SMT formula further comprises:
creating an SMT substitution map;
determining which of the SMT variables are not included in either or both of the simplified SMT variables and the SMT substitution map; and
outputting the SMT variables are not included in either or both of the simplified SMT variables and the SMT substitution map.

3. The method according to claim 1, wherein the determining which of the plurality of the SMT variables are "don't care" variables from the SAT formula further comprises:
obtaining an SAT solution trail by solving the SAT formula, wherein the SAT solution trail orders the SAT variables in an ordered list of SAT variables;
determining the first SAT variable in the ordered list of SAT variables that can be eliminated from the SAT formula while the SAT formula has a solution;
identifying the remaining SAT variables that can be eliminated from the SAT formula while the SAT formula has a solution; and
determining the SMT variables associated with SAT variables that can be eliminated.

4. The method according to claim 3, wherein obtaining an SAT solution trail further comprises applying the DPLL algorithm to the SAT formula.

5. The method according to claim 1, wherein obtaining an SAT formula further comprises bitblasting the simplified SMT formula.

6. The method according to claim 1, wherein the simplifying the SMT formula further comprises applying a linear array solver to the SMT formula and/or applying array read/write elimination on the SMT formula.

7. The method according to claim 1, further comprising determining whether there is an error in the programming code based on the "don't care" variables.

8. A method comprising:
receiving programming code;
obtaining, via analysis of each execution path of the programming code, an SMT formula from the programming code, the SMT formula including a plurality of SMT variables;
simplifying the SMT formula into a simplified SMT formula having a plurality of simplified SMT variables;
creating an SMT substitution map;
determining, via at least one processor, which of the SMT variables are not included in either or both of the simplified SMT formula and the SMT substitution map;
outputting the SMT variables that are not included in either or both of the simplified SMT formula and the SMT substitution map; and
using the SMT variables that are not included in either or both of the simplified SMT formula and the SMT substitution map to determine whether an error exists in the programming code.

9. The method according to claim 8, wherein the simplifying the SMT formula further comprises applying a linear array solver to the SMT formula, and/or applying array read/write elimination on the SMT formula.

10. The method according to claim 8, wherein the determining which of the SMT variables are not included in either or both of the simplified SMT variables and the SMT substitution map further comprises an iterative process that iterates through each of the SMT variables.

11. The method according to claim 8, wherein the SMT variables that are not included in either or both of the simplified SMT variables and the SMT substitution map are "don't care" variables.

12. The method according to claim 8, further comprising determining whether there is an error in the programming code based on the SMT variables that are not included in either or both of the simplified SMT formula and the SMT substitution map.

13. A method comprising:
obtaining, via analysis of each execution path of programming code stored in a local storage device, an SMT formula;
obtaining a simplified SMT formula from the SMT formula, the simplified SMT formula including a plurality of simplified SMT variables;
obtaining an SAT formula from the simplified SMT formula, the SAT formula including a plurality of SAT variables;
obtaining an SAT solution trail by solving the SAT formula, the SAT solution trail orders the SAT variables in an ordered list of SAT variables;
determining, via at least one processor, the first SAT variable in the ordered list of SAT variables that can be eliminated from the SAT formula while the SAT formula has a solution;
identifying the remaining SAT variables that can be eliminated from the SAT formula while the SAT formula has a solution;
determining, via the at least one processor, the SMT variables associated with SAT variables that can be eliminated; and
using the SMT variables associated with SAT variables that can be eliminated to determine whether an error exists in the programming code.

14. The method according to claim 13, wherein the obtaining an SAT formula further comprises bitblasting the simplified SMT formula.

15. The method according to claim 13, wherein obtaining an SAT solution trail further comprises applying the DPLL algorithm to the SAT formula.

16. The method according to claim 13, wherein the determining the first SAT variable in the ordered list of SAT variables that can be eliminated from the SAT formula further comprises an iterative process that illuminates at least half of the SAT variables from a portion of the SAT solution trail.

17. The method according to claim 16, wherein at least a portion of the SAT solution trail in a subsequent iteration is half the size of the SAT solution trail in the previous iteration.

18. The method according to claim 13, wherein obtaining an SMT formula further comprises:
    receiving the programming code; and
    creating the SMT formula having a plurality of SMT variables from the programming code.

19. The method according to claim 13, wherein the simplifying the SMT formula further comprises applying a linear array solver to the SMT formula and/or applying array read/write elimination on the SMT formula.

20. The method according to claim 13, further comprising determining whether there are errors in the programming code based on the SMT variables associated with SAT variables that can be eliminated.

* * * * *